(12) United States Patent
Bagge

(10) Patent No.: US 7,570,193 B2
(45) Date of Patent: Aug. 4, 2009

(54) DETECTING AND RECOGNIZING LONG DURATION WAVEFORMS

(75) Inventor: Nils Bagge, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 13 days.

(21) Appl. No.: 11/858,823

(22) Filed: Sep. 20, 2007

(65) Prior Publication Data

US 2008/0211712 A1  Sep. 4, 2008

Related U.S. Application Data

(60) Provisional application No. 60/881,882, filed on Jan. 22, 2007.

(51) Int. Cl.
*G01S 7/40* (2006.01)
*G01S 7/486* (2006.01)
*G01S 13/00* (2006.01)
*G01S 7/00* (2006.01)

(52) U.S. Cl. .................. 342/20; 342/13; 342/89; 342/90; 342/165; 342/173; 342/175; 342/195

(58) Field of Classification Search ............ 342/13–20, 342/175, 190–197, 89–103, 165–174
See application file for complete search history.

(56) References Cited

U.S. PATENT DOCUMENTS

| | | | | | |
|---|---|---|---|---|---|
| 3,660,844 | A | * | 5/1972 | Potter | 342/20 |
| 3,714,654 | A | * | 1/1973 | Wicks et al. | 342/13 |
| 3,716,853 | A | * | 2/1973 | La Follette | 342/190 |
| 3,881,101 | A | * | 4/1975 | Pederson et al. | 342/20 |
| 3,922,676 | A | * | 11/1975 | O'Berry et al. | 342/13 |
| 4,025,920 | A | * | 5/1977 | Reitboeck et al. | 342/13 |
| 4,146,892 | A | * | 3/1979 | Overman et al. | 342/20 |
| 5,010,341 | A | * | 4/1991 | Huntley et al. | 342/20 |
| 5,063,385 | A | * | 11/1991 | Caschera | 342/13 |
| 5,323,103 | A | * | 6/1994 | Choate et al. | 342/13 |
| 5,323,161 | A | * | 6/1994 | Gailer et al. | 342/13 |
| 5,451,956 | A | * | 9/1995 | Lochhead | 342/13 |
| 5,583,505 | A | * | 12/1996 | Andersen et al. | 342/13 |
| 6,177,902 | B1 | * | 1/2001 | Huntley et al. | 342/20 |
| 6,448,921 | B1 | * | 9/2002 | Tsui et al. | 342/13 |
| 6,697,013 | B2 | | 2/2004 | MacFarland et al. | |
| 6,831,589 | B2 | | 12/2004 | Shearer, III | |
| 6,842,137 | B2 | * | 1/2005 | Gounalis | 342/20 |
| 6,870,815 | B2 | | 3/2005 | McFarland et al. | |

(Continued)

*Primary Examiner*—Bernarr E Gregory
(74) *Attorney, Agent, or Firm*—Hickman Palermo Truong & Becker, LLP; Edward A. Becker

(57) ABSTRACT

A method and apparatus for processing signal pulses received by a device to identify the presence or absence of a waveform is provided. The waveform may have a long duration and may have a sparse energy distribution. An example of such a waveform is the bin-5 radar waveform. Based on the arrival rate of pulses, filtering of pulses is performed. The pulses that are not filtered out are grouped into bursts and information about the bursts is stored in a burst history. For example, the burst history might store the number of pulses in the burst and an inter-burst interval time. Entries over a certain age may be deleted from the burst history. The burst history is analyzed to determine if the pulses conform to a pattern associated with the waveform. The analysis may be based on various statistics. In an embodiment, only time domain information is analyzed.

26 Claims, 7 Drawing Sheets

U.S. PATENT DOCUMENTS

| | | |
|---|---|---|
| 6,891,496 B2 | 5/2005 | Husted et al. |
| 6,917,325 B2 * | 7/2005 | Gounalis ..................... 342/20 |
| 6,954,171 B2 | 10/2005 | Husted et al. |
| 7,061,423 B1 * | 6/2006 | Valentine et al. .............. 342/20 |
| 7,107,032 B2 | 9/2006 | Li |
| 7,129,884 B1 * | 10/2006 | Tehrani et al. ................ 342/20 |
| 7,148,835 B1 * | 12/2006 | Bricker et al. .................. 342/20 |
| 7,236,119 B2 * | 6/2007 | Gounalis ..................... 342/20 |
| 7,358,887 B2 * | 4/2008 | Gounalis ..................... 342/20 |
| 2004/0113832 A1 * | 6/2004 | Gounalis ..................... 342/13 |
| 2006/0199587 A1 | 9/2006 | Hansen |
| 2007/0018885 A1 | 1/2007 | Meil |

* cited by examiner

DETECTING AND RECOGNIZING LONG DURATION WAVEFORMS

CROSS-REFERENCE TO RELATED APPLICATIONS; PRIORITY CLAIM

This application claims benefit of Provisional Appln. 60/881,882, filed Jan. 22, 2007, the entire contents of which is hereby incorporated by reference as if fully set forth herein, under 35 U.S.C. § 119(e).

TECHNICAL FIELD

The present invention generally relates to wireless communications, and more specifically, to dynamic frequency selection (DFS), radar detection, pattern recognition, radio frequency (RF) monitoring, and interference identification.

BACKGROUND

Throughout the world, various communication regulatory bodies allow wireless communications devices, such as 802.11 devices, to operate in certain frequency bands subordinate to other transmitters. For example, in the United States unlicensed wireless devices are allowed to operate in the 5.250-5.350 and 5.470-5.725 GHz bands, provided that the devices employ dynamic frequency selection (DFS) to vacate the band if a radar signal is present in the band. Prior to and during transmission in these bands, the wireless device must monitor for radar waveforms and either vacate the band or flag the band as unavailable for present use by the device.

One such radar that the devices need to detect is bin-5 radar. Bin-5 radar waveforms are somewhat different from more traditional radar waveforms in that the bin-5 waveform is of very long duration and has a sparse energy distribution relative to more traditional radar waveforms, which may have durations on the order of hundreds of milliseconds. For example, the bin-5 waveform has a twelve second transmission period in which there may be very few pulses. In particular, a bin-5 waveform may have a total of 8 to 20 pulse bursts within the twelve second period. Each burst may have as few as one to three pulses.

The bin-5 waveform has several parameters whose values may be randomly selected, thus further complicating waveform detection. First, the number of pulses per burst may be randomly chosen. For example, there may be anywhere from one to three pulses per burst. Next, the space between pulses in a burst may be randomly chosen. For example, the inter-pulse arrival time could vary from between 1 ms and 2 ms. Furthermore, the length of each pulse in a burst has the same randomly chosen length between 50 to 100 microseconds. Finally, the time separation between each burst may be random. When these random factors, as well as others, are combined it is very difficult to recognize a pattern that corresponds to a bin-5 radar signal.

Due to the characteristics of bin-5 radar, techniques that are used to detect more traditional radars will either not work well or will be prohibitively expensive to implement if a bin-5 radar is to be detected. Note that if the device is not able to detect a radar with sufficient reliability, the device will not be qualified to operate in certain frequency bands.

While bin-5 is used as an example of a radar waveform whose detection is difficult, other waveforms of long duration and/or sparse energy distribution also present detection problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

An approach for processing pulses to identify the presence or absence of a waveforms having long durations is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Overview

Techniques are provided for processing signal pulses received by a device to identify the presence or absence of a waveform. An example of such a waveform is the bin-5 radar waveform. Embodiments of the present invention have low memory requirements, are robust to noise, and limit false alarm rate. Embodiments of the invention do not require specialized hardware.

An embodiment of the present invention comprises estimating the arrival rate of pulses and filtering out pulses on the estimated arrival rate. The pulses that are not filtered out are grouped into bursts and information about the bursts is stored in a burst history. For example, the burst history might store, for each burst, the number of pulses in the burst and an inter-burst interval. Entries over a certain age may be deleted from the burst history. The burst history is analyzed to determine if the pulses conform to a pattern associated with the waveform. The analysis may be based on various statistics. In an embodiment, only time domain information is analyzed.

Architectural Overview

Figure 1:
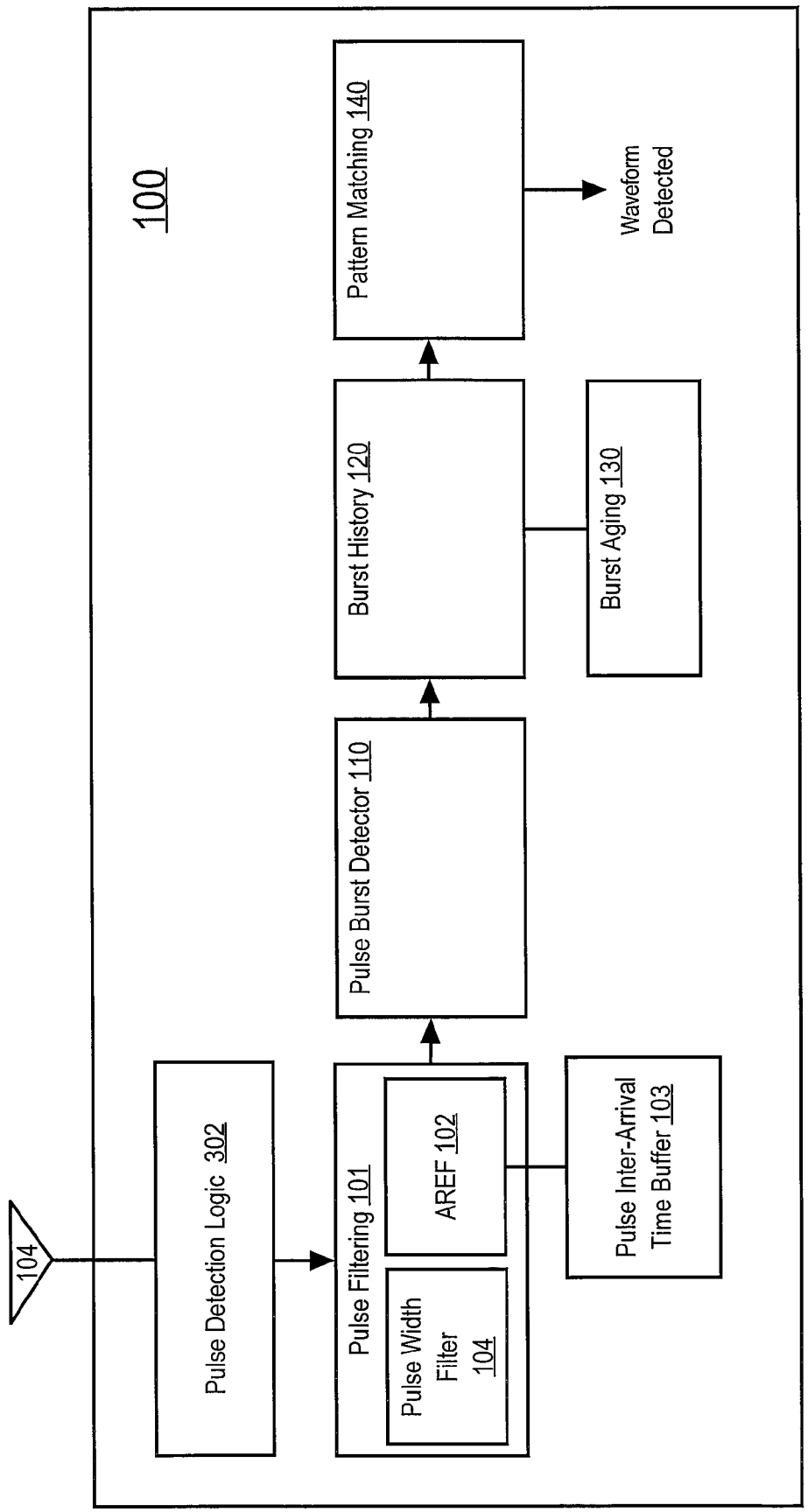
FIG. 1 is an overview of a device that is able to detect waveforms having a long duration, in accordance with an embodiment.

FIG. 1 is an overview of a device 100 that is able to detect waveforms having long durations, in accordance with an embodiment. In general, the device 100 comprises pulse filtering 101, pulse burst detector (PBD) 110, burst history 120, burst aging 130, and pattern matching 140. The boxes in the device 100 define logical functions or stored data (e.g., burst history 120, pulse inter-arrival time buffer 103). The arrows in FIG. 1 depict the order in which the logical functions are performed when processing a particular pulse. A functional overview of the device 100 is provided in the next section.

The logical functions can be implemented with software, hardware, or a combination of both. As an example, the filter 101, PBD 110, burst aging 130, and pattern matching 140 can be implemented as a set of instructions which, when executed on a processor, cause the processor to perform the logical functions. As another example, the logical functions could be implemented by circuitry such as an Application Specific Integrated Circuit (ASIC) or the like.

Functional Overview

Figure 2:
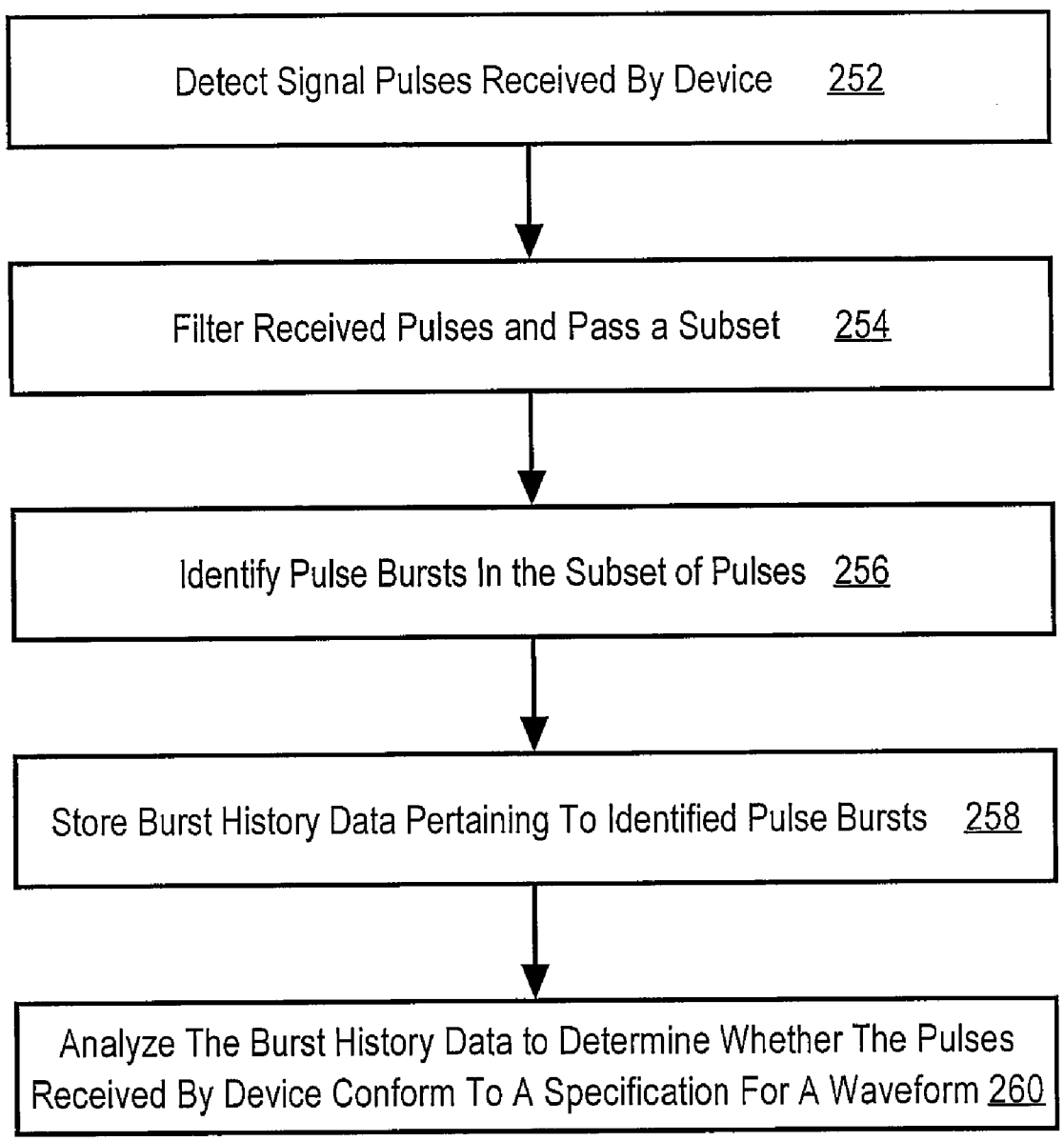
FIG. 2 is a flowchart of a process of detecting a waveform having a long duration, in accordance with an embodiment.

FIG. 2 is a flowchart of a process 200 of detecting waveforms having long durations, in accordance with an embodiment. Reference numerals from FIG. 1 will be used to discuss process 200. In step 252, the pulse detection logic 302, detects signal pulses received by the antenna 104. The pulse detection logic 302 passes sufficient information to the filter 101 for the filter 101 to determine when each pulse starts and stops, in an embodiment.

In step 254, the filter 101 filters out pulses based on differences of arrival times between pulses (box 102) and/or pulse width (box 104). In one embodiment, the filter 101 filters out pulses that have a width that is greater than a parameter pulse_width_max. In one embodiment, the filter 101 filters out pulses with a width that is less than a parameter pulse_width_min. Suitable values for pulse_width_max and pulse_width_min (if used) can be derived from a specification for the waveform being detected.

In one embodiment, the AREF 102 filters out received pulses whose arrival time relative to an earlier received pulse is less than a threshold time. The AREF 102 passes, to the PBD 110, received pulses that are not filtered out by the filter 101. Further details of the AREF 102 processing are discussed below.

In step 256, the PBD 110 identifies pulse bursts in the unfiltered pulses. A pulse burst may contain one or more pulses. For example, in a bin-5 radar, a pulse burst might contain from one to three pulses. However, a pulse burst could have more than three pulses. Further, the bursts are not limited to those that are compliant with a bin-5 radar.

Information pertaining to the bursts is stored in burst history data 120, in step 258. Examples of information that could be stored include, but are not limited to, a count of pulses for each burst, pulse widths, and arrival times of bursts, and or pulses. It is not required that all of the foregoing be stored. The burst aging 130 removes entries from the burst history 120 from time to time. The removal time is based on the length of the waveform being detected in an embodiment.

In step 260, the pattern matching 140 analyzes the burst history 120 to determine whether the signal pulses received by the device 100 conform to a specification for a waveform. The waveform is a bin-5 radar signal, in an embodiment. The pattern matching 140 outputs a waveform detection result.

Arrival Rate Estimation

Figure 3:
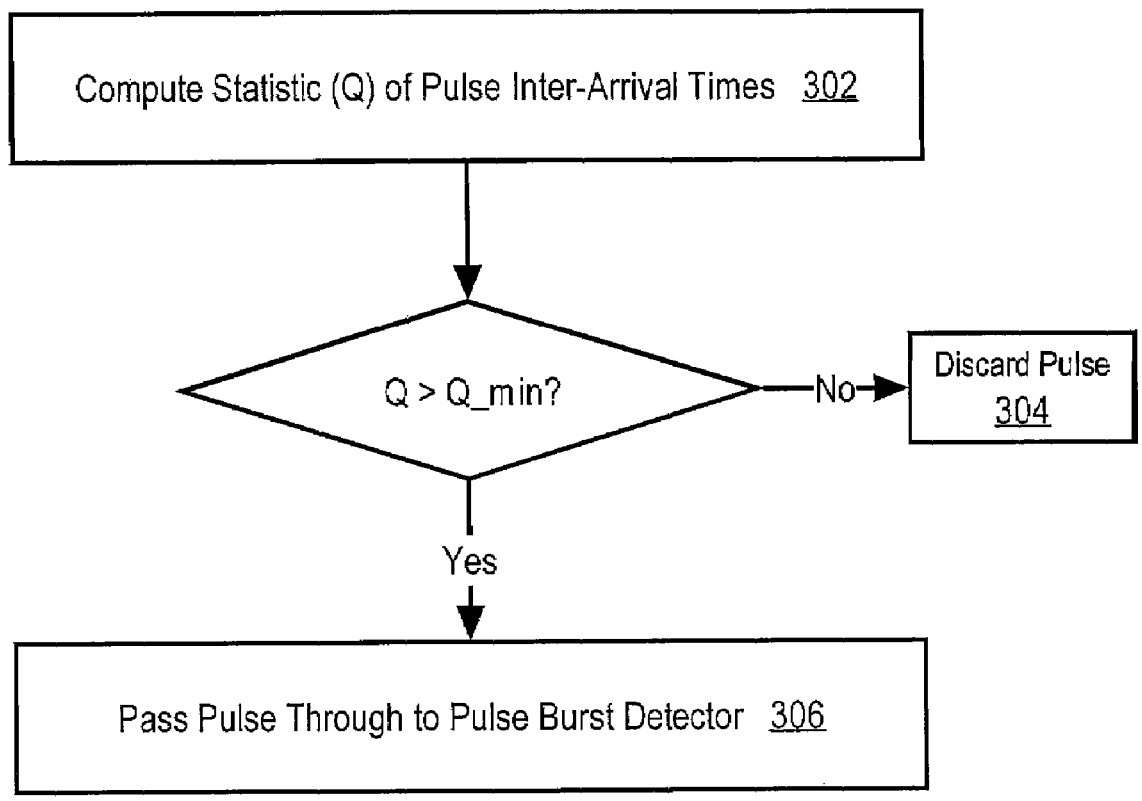
FIG. 3 depicts details of processing a pulse in an Arrival Rate Estimation and Filtering (AREF) Block of FIG. 1, in accordance with an embodiment.

FIG. 3 depicts details of processing a pulse in the Arrival Rate Estimation and Filtering (AREF) block 102 of FIG. 1, in accordance with an embodiment. If pulse width filtering is performed, typically it is performed prior to AREF filtering. However, pulse width filtering is not required. Also, pulse width filtering might be performed after AREF filtering.

The device 100 may receive waveforms other than the waveform under detection. The AREF 102 filters out pulses that are most likely not associated with the waveform under detection, which helps to prevent false positives and also helps to simplify later processing. The AREF 102 makes use of pulse inter-arrival times. Each pulse is assigned an "arrival time" based on when the pulse was received by the device 100. The arrival time can be the approximate time when the leading edge of the pulse first arrived at the device 100; however, using the leading edge is not an absolute requirement. The inter-arrival time for a given pulse refers to the time difference between its arrival time and that of the last pulse that was received.

In step 302, the AREF 102 calculates a statistic (Q) of the pulse inter-arrival times for the last "N" pulses. If pulse width filtering is performed prior to AREF, the inter-arrival times are of pulses not filtered out with width filtering. The AREF 102 stores the inter-arrival times in the pulse inter-arrival time buffer 103, in an embodiment. The pulse inter-arrival time buffer 103 is an "N" element circular buffer, in one embodiment. In one embodiment, the statistic that the AREF 102 computes is a moving average (mean) over the buffer 103. However, the statistic is not required to be a mean.

The AREF 102 determines whether the statistic (Q) is greater than a threshold, Q_min. An example value for Q_min that is suitable in an AREF 102 used in the detection a bin-5 radar is 200 milliseconds (ms). However, the value of Q_min could be higher or lower. The value for Q_min is stored in a programmable register, in one embodiment. Thus, the value could be adjusted based on the type of waveform that is currently being detected. If the statistic is greater than the threshold, then the most recently received pulse is discarded, in step 304. Otherwise, the most recently received pulse is retained. That is, information regarding the pulse is passed on to the pulse burst detector 110, in step 306.

Pulse Burst Detector

Figure 4:
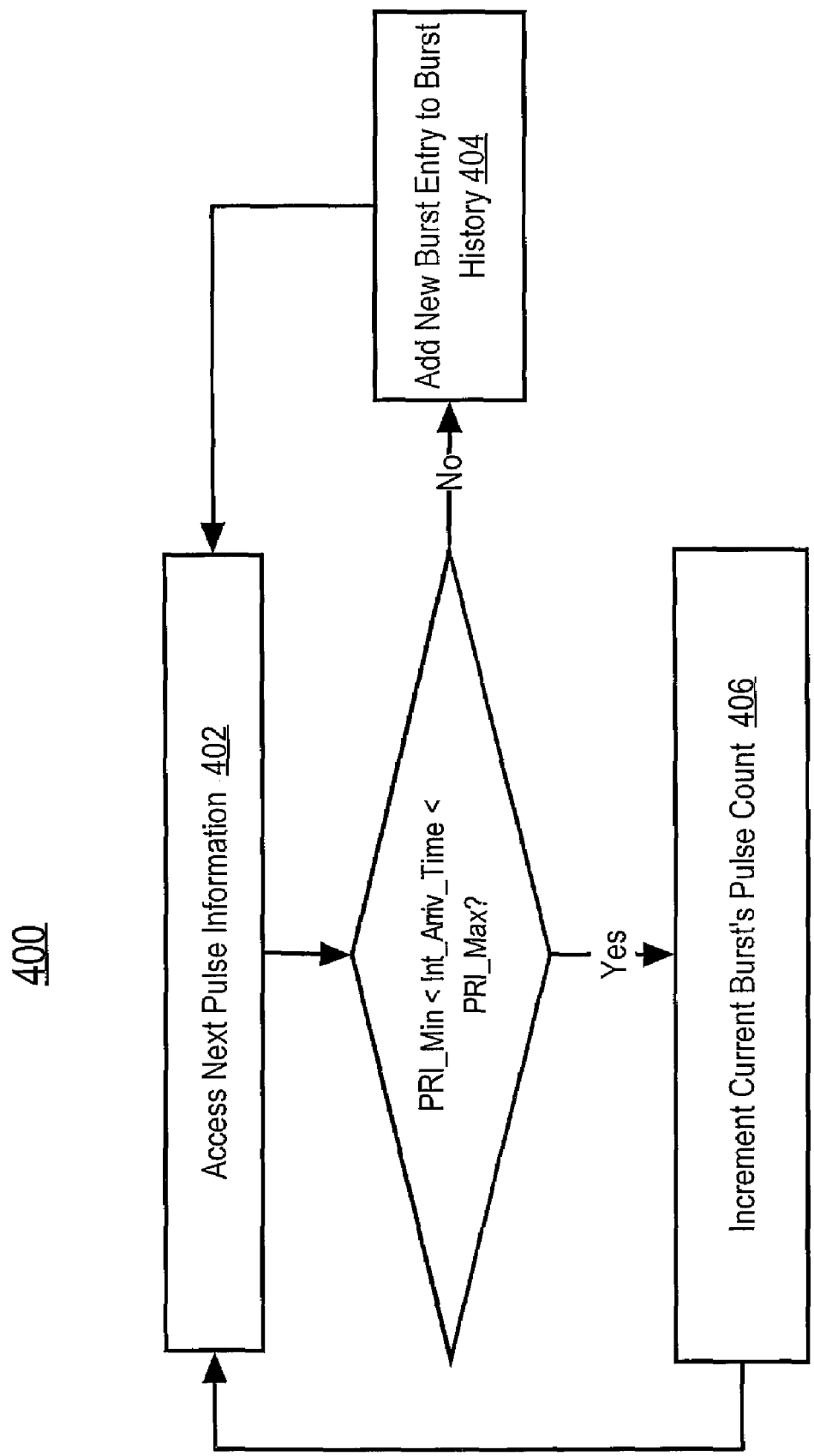
FIG. 4 depicts processing a pulse in a Pulse Burst Detector, in accordance with an embodiment.

Referring again to FIG. 1, if the pulse is not filtered out by the filter 101, it is passed to the pulse burst detector (PBD) 110. FIG. 4 depicts operation of the pulse burst detector 110, in accordance with an embodiment. In general, if the pulse falls within the time window for a valid pulse repetition interval (PRI), the pulse is hypothesized to be part of pulse burst.

A PRI is defined by the time between the arrival times of two successive pulses. The valid window is defined by the parameters PRI_min and PRI_max, which refer to the minimum PRI and maximum PRI. PRI_min and PRI_max are established based on the nature of the waveform under detection. For example, for the waveform to comply with a particular specification, pulses within a given burst should have a minimum PRI and maximum PRI. In one embodiment, PRI_min and PRI_max are derived from such values.

In step 402, processing of the current pulse begins by, for example, the PBD 110 accessing information about the pulse such as the current pulse's inter-arrival time. The current pulse's inter-arrival time is defined as the difference between its arrival time and the arrival time of the previous pulse that was processed by the PDB 110. If the current pulse's inter-arrival time is greater than the PRI_min and less than PRI_max, then the current pulse is hypothesized as being part of a pulse. Therefore, the pulse count in the pulse history 120 is updated.

If the current pulse's inter-arrival time is outside of the valid window, a new burst entry is created in the burst history 120, in step 406.

It is not required that the PBD 110 analyze the PRI to determine whether a pulse is part of a burst. Examples of other types of information the PBD 110 might analyze include, but are not limited to, a variance of a BRI, and a variance of the number of pulses per burst.

Example Burst History

Figure 5:
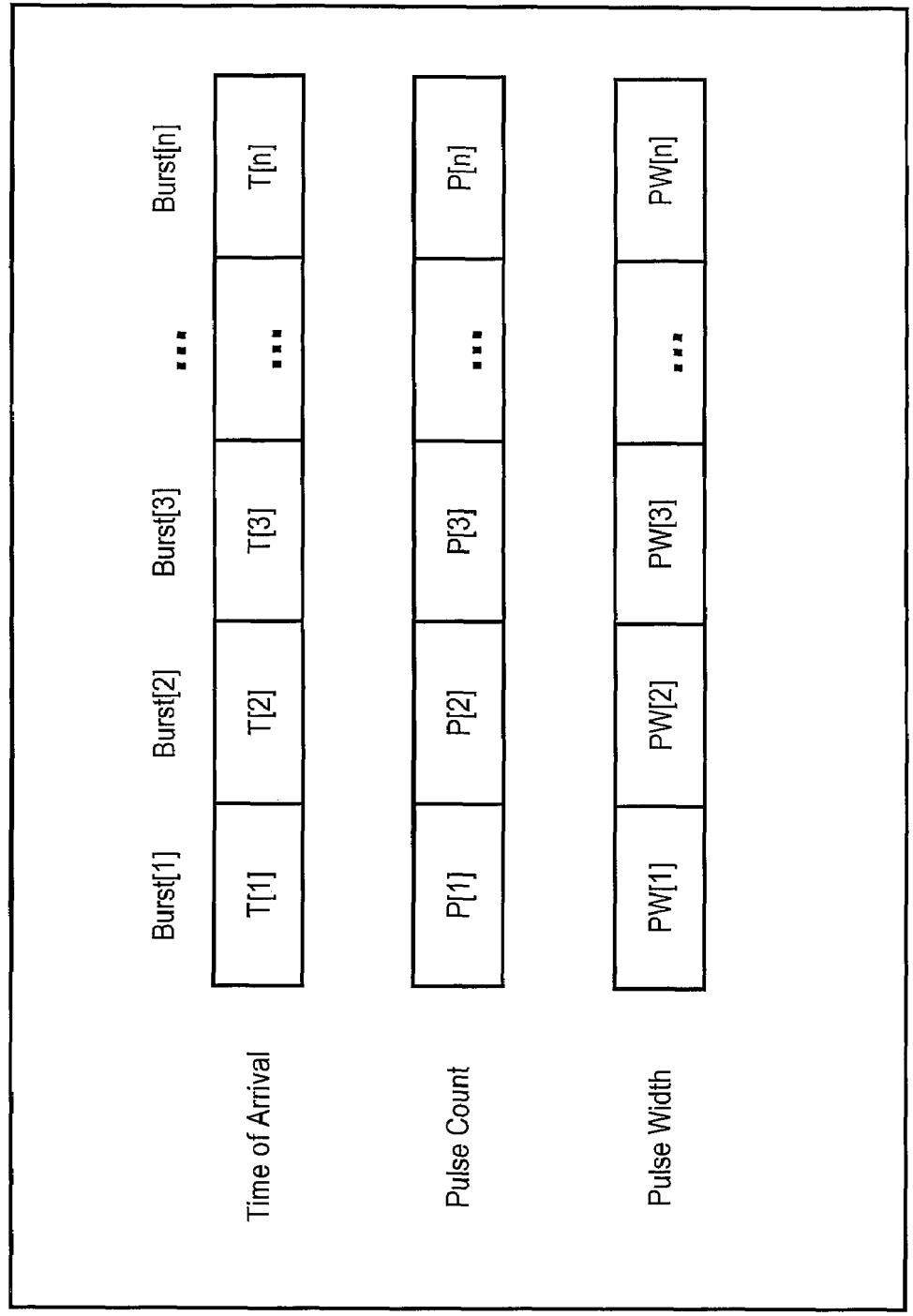
FIG. 5 depicts a data structure which stores a record of received bursts, in accordance with an embodiment.

FIG. 5 depicts details of an example burst history 120, in accordance with one embodiment. In particular, the example burst history 120 stores a record of received bursts. For each burst, the example burst history 120 maintains a count of pulses in the burst, the pulsewidth for the pulses in the burst, and the time of arrival that marks the beginning of the burst. In this example, each pulse in a given burst is assumed to have the same width. Therefore, only a single pulse width is stored per burst. However, the width of each pulse could be stored. In one embodiment, the burst history 120 does not store pulse width information.

In one embodiment, the burst history 120 only maintains entries for a limited time period (the maximum age). This time period is greater than (or equal to) the longest pattern that is to be matched, in one embodiment. The aging function 130 deletes bursts from the burst history 120 that are older than the maximum age, in an embodiment.

Note that the information in the burst history 120 is derived from time domain information. The burst history 120 could include other information such as frequency domain information; however, frequency domain information is not required.

Pattern Matching

Figure 6:
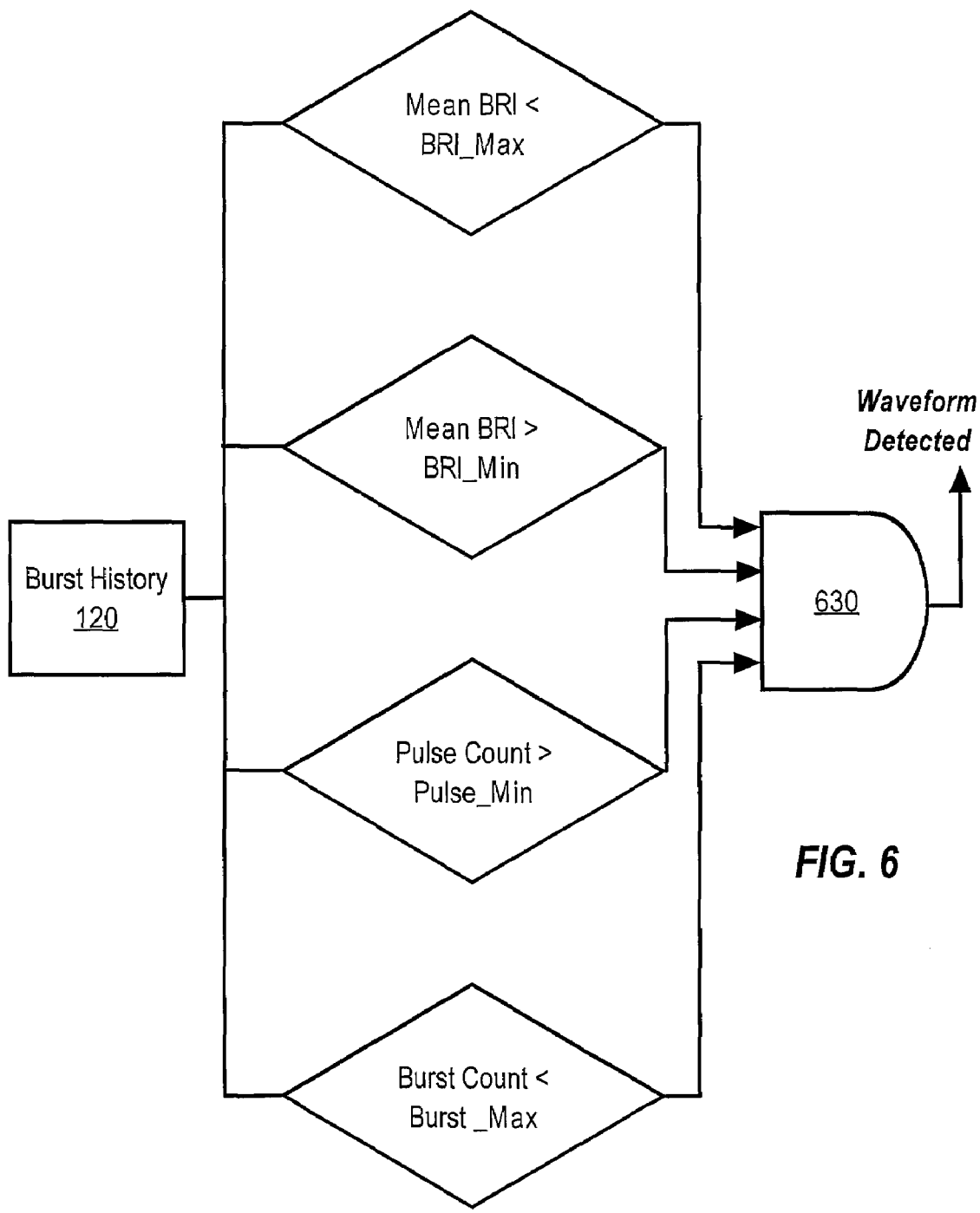
FIG. 6 depicts an example Pattern Matching Block, in accordance with an embodiment.

FIG. 6 depicts an example of the pattern matching block 140, in accordance with an embodiment. The pattern matching accesses the burst history 120 and compares the stored burst information with expected statistics that pertain to the waveform being detected, in one embodiment. Examples of statistics that are used may include a burst repetition interval (BRI), pulse count (per burst or per unit time), and burst count per unit time. In the embodiment of FIG. 6, each of several conditions should be true for the pattern matching block 140 to conclude that the waveform has been detected. The AND logic 630 outputs a signal if the waveform has been detected. The testing of the conditions may be implemented in software; therefore, the AND logic 630 and the conditionals are implemented by executing instructions on a processor in an embodiment. However, if desired, the pattern matching block 140 could be implemented by hardware such as logic gates, etc. Other logic functions, such as OR, XOR, etc., and combinations thereof, could be added or substituted to/for AND logic 630 in an embodiment.

In an embodiment, the pattern matching block 140 uses the following information from the burst history (120): number of bursts that have been detected; number of pulses within each burst; time intervals between bursts. Note that because entries may be removed from the burst history 120, the burst count in the burst history 120 reflects information per unit time, in an embodiment. From these inputs, computation is performed to determine whether the observed signal meets the specifications of the desired waveform.

As previously discussed, a burst repetition interval (BRI) refers to the gap in time between two bursts. In one embodiment, the BRI is computed as the difference between the arrival times of two successive bursts. The arrival time of a burst is defined by the arrival time of the first pulse in the burst, in an embodiment. The mean BRI is the statistical mean for all of the burst entries in the burst history 120, in an embodiment that removes entries based on their age.

One condition that is input to the AND logic 630 is whether the mean BRI is within a window defined by a BRI_min and a BRI_max. The parameters BRI_min and BRI_max may be based on expected characteristics of the waveform being detected. For example, a bin-5 waveform might be expected to have between 8 and 20 bursts over a 12 second time interval. Other waveforms might be expected to have other ranges.

Another condition that is input to the AND logic 630 is based on the number of pulses. In this embodiment, the number of pulses over a unit of time is compared with a parameter pulses_min. If the number is at least pulses_min, then the condition passes. The number of pulses over a unit of time might also be compared to a parameter pulses_max. However, this may not be necessary due to testing for the next condition based on a maximum number of bursts. Also note a condition could be based on the number of pulses per burst, such as a statistical average of the number of pulses per burst. Other pulse statistics might also be used, such as variance, and median.

Another condition that is input to the AND logic 630 is based on the number of bursts. In one embodiment, the number of bursts over a unit of time is compared with a parameter bursts_max. If the number is less than bursts_max, then the condition passes. As with the pulse conditions, other conditions pertaining to the number of bursts might be used. For example, the number of bursts over a unit of time might also be compared to a parameter bursts_min. However, this may not be necessary due to testing for the previous condition based on a minimum number of pulses.

In this example, the information in the conditionals is all based on time domain information. If desired, additional conditions, which may or may not be based on time domain information, can be added used. As an example, frequency domain information could be used. However, frequency information is not required to accurately detect the waveform, in an embodiment.

The approach for spectrum analysis described herein may be implemented in a variety of ways and the invention is not limited to any particular implementation. The approach may be integrated into a wireless communications system or a wireless device, or may be implemented as a stand-alone mechanism. Furthermore, the approach may be implemented in computer software, hardware, or a combination thereof.

Hardware Overview

Figure 7:
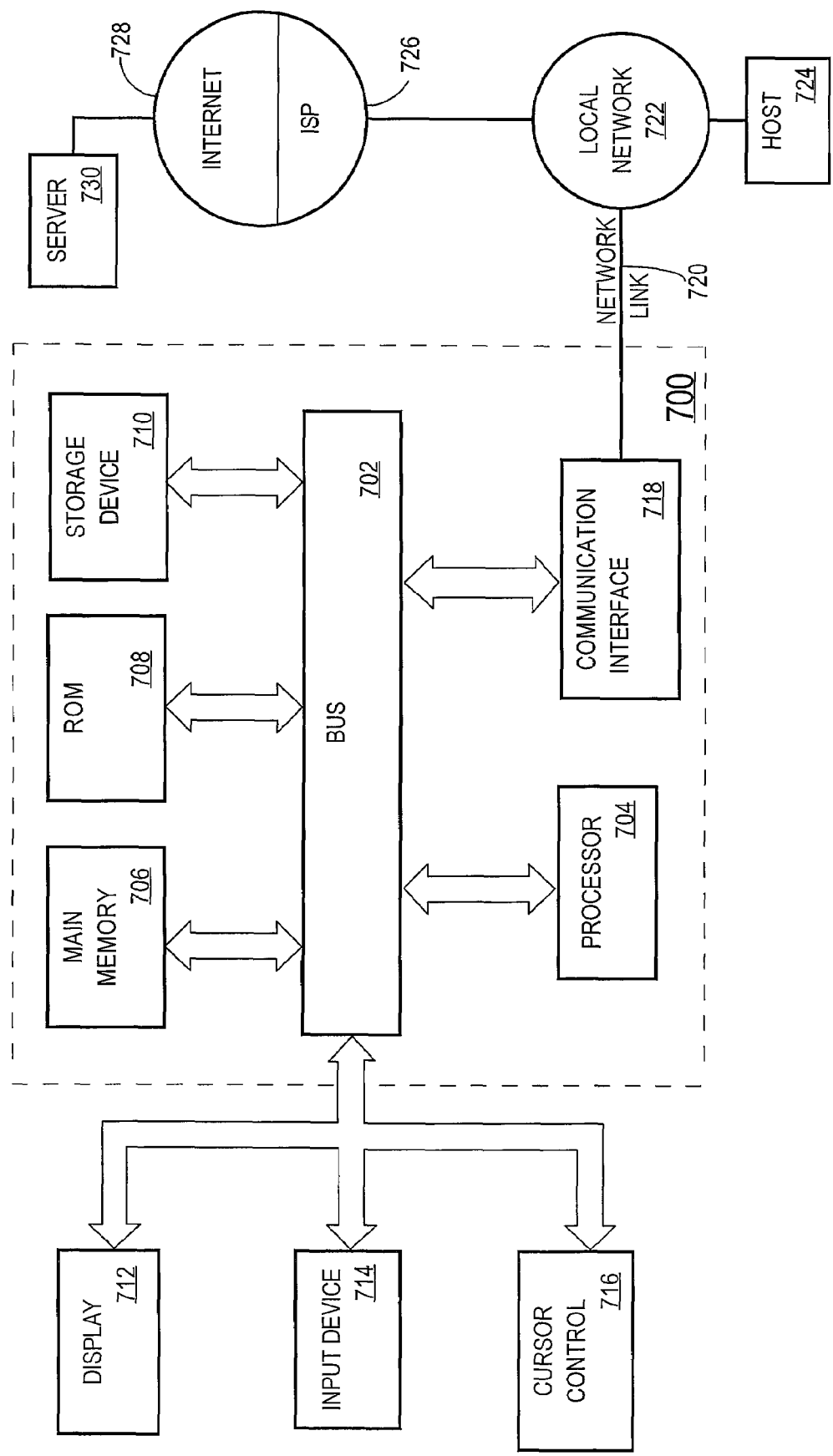
FIG. 7 is a block diagram that depicts a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device comprising:
   a pulse detector that is operable to detect pulses received by the device;
   a filter operable to filter out received pulses whose arrival time relative to an earlier received pulse is less than a threshold time;
   pulse burst matching logic operable to identify pulse bursts in pulses that are not filtered by the filter, wherein a pulse burst comprises at least one pulse;
   a burst history memory operable to store burst history data pertaining to identified pulse bursts; and decision logic operable to analyze the burst history data in order to determine whether the pulses received by the device conform to a specification for a waveform.

2. The device of claim 1, wherein the waveform is a radar signature.

3. The device of claim 1, wherein the decision logic is further operable to analyze the burst history data based on decision statistics.

4. The device of claim 1, wherein the decision logic is operable to determine whether the pulses received by the device conform to the waveform based only on analysis of burst history data that is time domain data.

5. The device of claim 1, wherein the decision logic is operable to determine whether the pulses received by the device conform to the waveform based only on analysis of data that is based on arrival time of pulses received by the device.

6. The device of claim 1, wherein the filter is further operable to filter out pulses based on pulse width of the pulses received by the device.

7. The device of claim 1, further comprising burst aging logic operable to remove burst data that is older than a certain length of time.

8. The device of claim 1, wherein the decision logic is further operable to determine whether the pulses received by the device conform to the specification for the waveform based on a determination of whether a set of conditions are true, wherein the set of conditions include:
whether a burst repetition interval for bursts in the burst history data complies with a criterion, wherein burst repetition interval is defined by the difference in arrival times of successive bursts.

9. The device of claim 8, wherein the set of conditions further includes whether a count of pulses in the burst history data complies with a criterion.

10. The device of claim 9, wherein the set of conditions further includes whether a count of bursts in the burst history data complies with a criterion.

11. The device of claim 8, wherein the set of conditions further includes whether a count of bursts in the burst history data complies with a criterion.

12. A method comprising:
detecting signal pulses received by a device;
filtering out received pulses whose arrival time relative to an earlier received pulse is less than a threshold time;
identifying pulse bursts in received pulses that are not filtered out;
storing burst history data pertaining to identified pulse bursts;
analyzing the burst history data; and
based on the analysis of the burst history data, determining whether the signal pulses received by the device conform to a specification for a waveform.

13. The method of claim 12, wherein determining whether the signal pulses received by the device conform to a specification for a waveform includes determining whether the signal pulses received by the device conform to a radar signature.

14. The method of claim 13, wherein the radar signature is substantially compliant with a bin-5 radar.

15. The method of claim 12, wherein analyzing the burst history data includes performing a statistical analysis of the burst history.

16. The method of claim 12, wherein determining whether the signal pulses received by the device conform to a specification for a waveform includes determining whether the pulses received by the device conform to the waveform based only on analysis of burst history data that is time domain data.

17. The method of claim 12, wherein determining whether the signal pulses received by the device conform to a specification for a waveform includes determining whether the pulses received by the device conform to the waveform based only on analysis of data that is based on arrival time of pulses received by the device.

18. The method of claim 12, further comprising:
prior to filtering out received pulses based on arrival time, filtering out received pulses based on pulse width of the pulses received by the device.

19. The method of claim 12, further comprising removing burst history data that is older than a certain length of time.

20. A method comprising:
detecting signal pulses received by a device;
identifying pulse bursts in at least a subset of the received pulses;
storing burst history data pertaining to identified pulse bursts, wherein the burst data includes an arrival time for each burst and a count of pulses for each burst;
removing burst history data that is older than a given age;
determining whether a set of conditions are true, wherein the set of conditions includes:
whether a burst repetition interval for bursts in the burst history data complies with a criterion, wherein a burst repetition interval is defined by the difference in arrival times of successive bursts;
whether a count of pulses in the burst history data complies with a criterion; and
whether a count of bursts in the burst history data complies with a criterion; and
if the set of conditions is true, outputting an indication that the signal pulses received by a device include a bin-5 waveform.

21. The method of claim 20, wherein the condition of whether burst repetition interval for bursts in the burst history data complies with a criterion is defined by:
whether an average burst repetition interval for bursts in the burst history data is less than a maximum burst repetition interval, wherein a burst repetition interval is defined by the difference in arrival times of successive bursts.

22. The method of claim 21, wherein the condition of whether burst repetition interval for bursts in the burst history data complies with a criterion is further defined by:
whether the average burst repetition interval is more than a minimum burst repetition interval.

23. The method of claim 20, wherein the condition of whether the count of pulses in the burst history data complies with the criterion is defined by:
whether the count of pulses in the burst history data is greater than a minimum pulse count.

24. The method of claim 20, wherein the condition of whether the count of bursts in the burst history data complies with a criterion is defined by:
whether the count of bursts in the burst history data is less than a maximum burst count.

25. The method of claim 20, further comprising filtering out received pulses whose arrival time relative to an earlier received pulse is less than a threshold time, wherein the subset comprises only pulses that are not filtered out.

26. The method of claim 20, further comprising filtering out received pulses based on pulse width of the pulses received by the device, wherein the subset comprises only pulses that are not filtered out.

* * * * *

INTER PARTES REEXAMINATION CERTIFICATE (767th)

United States Patent
Bagge

(10) Number: US 7,570,193 C1
(45) Certificate Issued: Dec. 11, 2013

(54) DETECTING AND RECOGNIZING LONG DURATION WAVEFORMS

(75) Inventor: Nils Bagge, Austin, TX (US)

(73) Assignee: Bandspeed, Inc., Austin, TX (US)

Reexamination Request:
No. 95/000,641, Aug. 23, 2011

Reexamination Certificate for:
Patent No.: 7,570,193
Issued: Aug. 4, 2009
Appl. No.: 11/858,823
Filed: Sep. 20, 2007

Related U.S. Application Data

(60) Provisional application No. 60/881,882, filed on Jan. 22, 2007.

(51) Int. Cl.
*G01S 7/40* (2006.01)

(52) U.S. Cl.
USPC .............. 342/20; 342/13; 342/165; 342/173; 342/175; 342/195; 342/89; 342/90

(58) Field of Classification Search
None
See application file for complete search history.

(56) References Cited

To view the complete listing of prior art documents cited during the proceeding for Reexamination Control Number 95/000,641, please refer to the USPTO's public Patent Application Information Retrieval (PAIR) system under the Display References tab.

*Primary Examiner* — Jason Proctor

(57) ABSTRACT

A method and apparatus for processing signal pulses received by a device to identify the presence or absence of a waveform is provided. The waveform may have a long duration and may have a sparse energy distribution. An example of such a waveform is the bin-5 radar waveform. Based on the arrival rate of pulses, filtering of pulses is performed. The pulses that are not filtered out are grouped into bursts and information about the bursts is stored in a burst history. For example, the burst history might store the number of pulses in the burst and an inter-burst interval time. Entries over a certain age may be deleted from the burst history. The burst history is analyzed to determine if the pulses conform to a pattern associated with the waveform. The analysis may be based on various statistics. In an embodiment, only time domain information is analyzed.

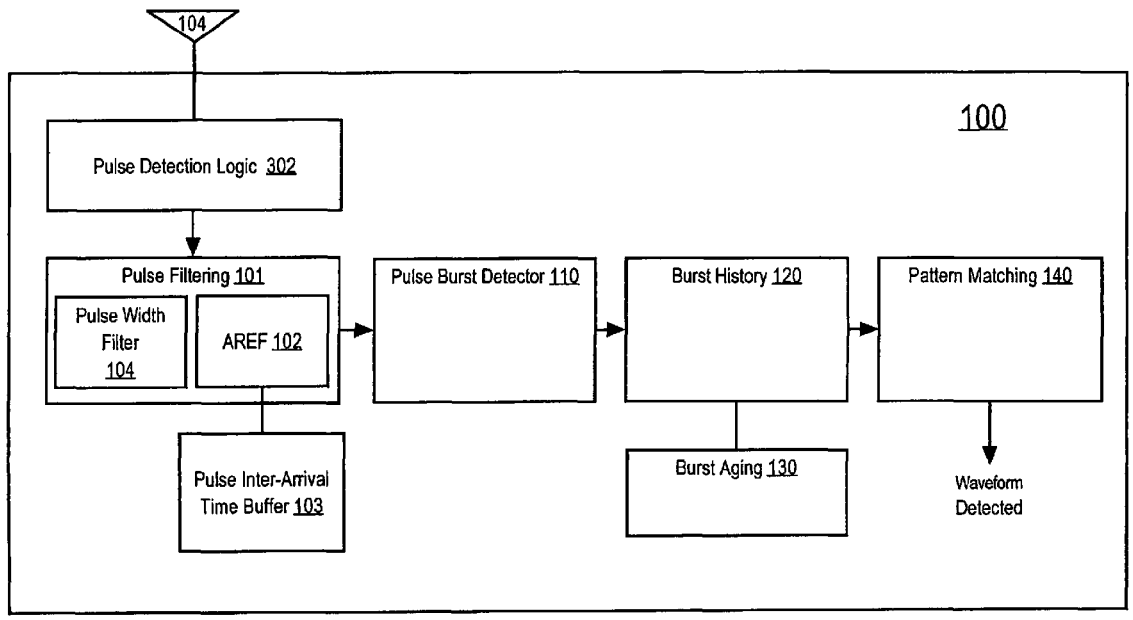

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6, 7, 8, 12, 13, 18 and 19 are cancelled.

Claims 3-5, 9-11, 14-17, 20-22 and 25-26 are determined to be patentable as amended.

Claims 23-24, dependent on an amended claim, are determined to be patentable.

New claims 27-28 are added and determined to be patentable.

3. [The device of claim 1,] *A device comprising:*
*a pulse detector that is operable to detect pulses received by the device over a particular duration;*
*a filter operable to filter out received pulses whose arrival time relative to an earlier received pulse is less than a threshold time to produce a subset of received pulses that are not filtered out by the filter;*
*pulse burst matching logic operable to identify pulse bursts in the subset of received pulses that are not filtered out by the filter, wherein a pulse burst comprises at least one pulse;*
*a burst history memory operable to store burst history data pertaining to the identified pulse bursts; and*
*decision logic operable to analyze the burst history data in order to determine whether the subset of pulses received by the device over the particular duration conform to a specification for a radar waveform with random characteristics;*
*wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;*
wherein the decision logic is operable to determine whether the subset of pulses received by the device over the particular duration conform to the specification of the radar waveform with random characteristics based at least in part on whether a statistic, determined from at least burst repetition intervals of the identified pulse bursts, complies with a criterion;
wherein the decision logic is further operable to [analyze the burst history data based on decision statistics] *determine whether the subset of pulses received by the device over the particular duration conform to the specification of the radar waveform with random characteristics based at least in part on whether a mean burst repetition interval, determined from burst repetition intervals of the identified pulse bursts, complies with a criterion.*

4. [The device of claim 1,] *A device comprising:*
*a pulse detector that is operable to detect pulses received by the device over a particular duration;*
*a filter operable to filter out received pulses whose arrival time relative to an earlier received pulse is less than a threshold time to produce a subset of received pulses that are not filtered out by the filter;*
*pulse burst matching logic operable to identify pulse bursts in the subset of received pulses that are not filtered out by the filter, wherein a pulse burst comprises at least one pulse;*
*a burst history memory operable to store burst history data pertaining to the identified pulse bursts; and*
*decision logic operable to analyze the burst history data in order to determine whether the subset of pulses received by the device over the particular duration conform to a specification for a radar waveform with random characteristics;*
*wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;*
*wherein the decision logic is operable to determine whether the subset of pulses received by the device over the particular duration conform to the specification of the radar waveform with random characteristics based at least in part on whether a statistic, determined from at least burst repetition intervals of the identified pulse bursts, complies with a criterion;*
wherein the decision logic is operable to determine whether the *subset of* pulses received by the device *over the particular duration* conform to the *specification of the radar* waveform [based only on analysis of burst history data that is time domain data] *with random characteristics based at least in part on whether a statistic, determined from at least burst repetition intervals of the identified pulse bursts, complies with a criterion, and whether a count of the identified pulse bursts complies with a criterion.*

5. [The device of claim 1,] *A device comprising:*
*a pulse detector that is operable to detect pulses received by the device over a particular duration;*
*a filter operable to filter out received pulses whose arrival time relative to an earlier received pulse is less than a threshold time to produce a subset of received pulses that are not filtered out by the filter;*
*pulse burst matching logic operable to identify pulse bursts in the subset of received pulses that are not filtered out by the filter, wherein a pulse burst comprises at least one pulse;*
*a burst history memory operable to store burst history data pertaining to the identified pulse bursts; and* decision logic operable to analyze the burst history data in order to determine whether the subset of pulses received by the device over the particular duration conform to a specification for a radar waveform with random characteristics;

wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;

wherein the decision logic is operable to determine whether the subset of pulses received by the device over the particular duration conform to the specification of the radar waveform with random characteristics based at least in part on whether a statistic, determined from at least burst repetition intervals of the identified pulse bursts, complies with a criterion;

wherein the decision logic is operable to determine whether the *subset of* pulses received by the device *over the particular duration* conform to the *specification of the radar* waveform [based only on analysis of data that is based on arrival time of pulses received by the device] *with random characteristics based at least in part on whether a statistic, determined from at least burst repetition intervals of the identified pulse bursts, complies with a criterion, whether a count of the identified pulse bursts complies with a criterion, and whether a count of pulses of the identified pulse bursts complies with a criterion.*

9. [The device of claim 8,] *A device comprising:*

*a pulse detector that is operable to detect pulses received by the device over a particular duration;*

*a filter operable to filter out received pulses whose arrival time relative to an earlier received pulse is less than a threshold time to produce a subset of received pulses that are not filtered out by the filter;*

*pulse burst matching logic operable to identify pulse bursts in the subset of received pulses that are not filtered out by the filter, wherein a pulse burst comprises at least one pulse;*

*a burst history memory operable to store burst history data pertaining to the identified pulse bursts; and*

*decision logic operable to analyze the burst history data in order to determine whether the subset of pulses received by the device over the particular duration conform to a specification for a radar waveform with random characteristics;*

*wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;*

*wherein the decision logic is operable to determine whether the subset of pulses received by the device over the particular duration conform to the specification of the radar waveform with random characteristics based at least in part on whether a statistic, determined from at least burst repetition intervals of the identified pulse bursts, complies with a criterion;* wherein the [set of conditions further includes whether a count of pulses in the burst history data complies with a criterion] *filter is operable, in response to detecting a received pulse, to compute a statistic of received pulse inter-arrival times for a number of recently received pulses that includes the received pulse, and filter out the received pulse based on whether the computed statistic of received pulse inter-arrival times satisfies a criterion; wherein the computed statistic of received pulse inter-arrival times is a moving average of received pulse inter-arrival times.*

10. [The device of claim 9,] *A device comprising:*

*a pulse detector that is operable to detect pulses received by the device over a particular duration;*

*a filter operable to filter out received pulses whose arrival time relative to an earlier received pulse is less than a threshold time to produce a subset of received pulses that are not filtered out by the filter;*

*pulse burst matching logic operable to identify pulse bursts in the subset of received pulses that are not filtered out by the filter, wherein a pulse burst comprises at least one pulse;*

*a burst history memory operable to store burst history data pertaining to the identified pulse bursts; and*

*decision logic operable to analyze the burst history data in order to determine whether the subset of pulses received by the device over the particular duration conform to a specification for a radar waveform with random characteristics;*

*wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;*

*wherein the decision logic is operable to determine whether the subset of pulses received by the device over the particular duration conform to the specification of the radar waveform with random characteristics based at least in part on whether a statistic, determined from at least burst repetition intervals of the identified pulse bursts, complies with a criterion;* wherein the [set of conditions further includes whether a count of bursts in the burst history data complies with a criterion] *pulse burst matching logic is operable to perform, for each pulse in the subset of pulses that are not filtered out by the filter, a comparison between the arrival time of the each pulse and the arrival time of the immediately previously received pulse that is not filtered* by the filter; wherein the pulse burst matching logic is operable to automatically form, in the burst history memory, a plurality of burst entries based on results of the comparisons;

wherein the plurality of burst entries indicate burst repetition intervals of the identified pulse bursts; wherein burst repetition intervals indicated by the plurality of burst entries are established based on results of the comparisons; and wherein the decision logic is operable to determine whether the subset of pulses received by the device over the particular duration conform to the specification of the radar waveform with random characteristics based at least in part on whether a statistic, determined from at least indicated burst repetition intervals of the identified pulse bursts, complies with a criterion.

11. The device of claim [8] *10*, wherein the [set of conditions further includes whether a count of bursts in the burst history data complies with a criterion] *pulse burst matching logic is operable to automatically assign the subset of pulses to the plurality of burst entries by incrementing, for each pulse in the subset of pulses, a pulse count of the burst entry to which the each pulse is assigned.*

14. [The method of claim 13,] *A method comprising:* detecting signal pulses received by a device over a particular duration;

filtering out received pulses whose arrival time relative to an earlier received pulse is less than a threshold time to produce a subset of received pulses that are not filtered out;

identifying pulse bursts in the subset of received pulses that are not filtered out;

storing burst history data pertaining to the identified pulse bursts;

analyzing the burst history data; and based on the analysis of the burst history data, determining whether the subset of signal pulses received by the device over the particular duration conform to a specification for a radar waveform with random characteristics;

wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;

wherein analyzing the burst history data includes determining a statistic from at least burst repetition intervals of the identified pulse bursts; and wherein determining whether the subset of pulses received by the device over the particular duration conform to the specification of the radar waveform with random characteristics includes determining whether the statistic complies with a criterion;

wherein [the radar signature is substantially compliant with a bin-5 radar] *analyzing the burst history data includes determining a mean burst repetition interval from burst repetition intervals of the identified pulse bursts; and wherein determining whether the subset of pulses received by the device over the particular duration conform to the specification of the radar waveform with random characteristics includes determining whether the mean burst repetition interval complies with a criterion.*

15. [The method of claim 12,] *A method comprising:* detecting signal pulses received by a device over a particular duration;

filtering out received pulses whose arrival time relative to an earlier received pulse is less than a threshold time to produce a subset of received pulses that are not filtered out;

identifying pulse bursts in the subset of received pulses that are not filtered out;

storing burst history data pertaining to the identified pulse bursts;

analyzing the burst history data; and based on the analysis of the burst history data, determining whether the subset of signal pulses received by the device over the particular duration conform to a specification for a radar waveform with random characteristics;

wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;

wherein analyzing the burst history data includes determining a statistic from at least burst repetition intervals of the identified pulse bursts; and wherein determining whether the subset of pulses received by the device over the particular duration conform to the specification of the radar waveform with random characteristics includes determining whether the statistic complies with a criterion;

wherein analyzing the burst history data includes [performing a statistical analysis of the burst history] *determining a statistic from at least burst repetition intervals of the identified pulse bursts, and includes determining a count of the identified pulse bursts; and wherein determining whether the subset of pulses received by the device over the particular duration conform to the specification of the radar waveform with random characteristics includes determining whether the statistic complies with a criterion, and determining whether the count of the identified pulse bursts compiles with a criterion.*

16. [The method of claim 12,] *A method comprising:* detecting signal pulses received by a device over a particular duration;

filtering out received pulses whose arrival time relative to an earlier received pulse is less than a threshold time to produce a subset of received pulses that are not filtered out;

identifying pulse bursts in the subset of received pulses that are not filtered out;

storing burst history data pertaining to the identified pulse bursts;

analyzing the burst history data; and based on the analysis of the burst history data, determining whether the subset of signal pulses received by the device over the particular duration conform to a specification for a radar waveform with random characteristics;

wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;

wherein analyzing the burst history data includes determining a statistic from at least burst repetition intervals of the identified pulse bursts; and wherein determining whether the subset of pulses received by the device over the particular duration conform to the specification of the radar waveform with random characteristics includes determining whether the statistic complies with a criterion;

wherein *analyzing the burst history data includes determining a statistic from at least burst repetition intervals of the identified pulse bursts,* includes determining a count of the identified pulse bursts, *and includes determining a count of pulses of the identified pulse bursts; and* wherein determining whether the *subset of* signal pulses received by the device *over the particular duration* conform to [a] *the* specification for [a] *the radar* waveform with random characteristics includes determining whether the [pulses received by the device conform to the waveform based only on analysis of burst history data that is time domain data] *statistic complies with a criterion, includes determining whether the count of the identified pulse bursts complies with a criterion, and includes determining whether the count of pulses of the identified pulse bursts compiles with a criterion.*

17. [The method of claim 12.] *A method comprising:* detecting signal pulses received by a device over a particular duration;

filtering out received pulses whose arrival time relative to an earlier received pulse is less than a threshold time to produce a subset of received pulses that are not filtered out;

identifying pulse bursts in the subset of received pulses that are not filtered out;

storing burst history data pertaining to the identified pulse bursts;

analyzing the burst history data; and based on the analysis of the burst history data, determining whether the subset of signal pulses received by the device over the particular duration conform to a specification for a radar waveform with random characteristics;

wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a range, and wherein pulse repetition intervals of pulses in a pulse burst are random within a range, wherein pulse repetition interval in a pulse burst is defined by arrival times of successive pulses in the pulse burst;

wherein analyzing the burst history data includes determining a statistic from at least burst repetition intervals of the identified pulse bursts; and wherein determining whether the subset of pulses received by the device over the particular duration conform to the specification of the radar waveform with random characteristics includes determining whether the statistic complies with a criterion;

wherein [determining whether the signal pulses received by the device conform to a specification for a waveform includes determining whether the pulses received by the device conform to the waveform based only on analysis of data that is based on arrival time of pulses received by the device] *identifying pulse bursts includes performing, for each pulse in the subset of pulses that are not filtered out, a comparison between the arrival time of the each pulse and the arrival time of the immediately previously received pulse that is not filtered, and includes automatically forming, in a computer memory, a plurality of burst entries based on results of the comparisons; wherein the plurality of burst entries indicate burst repetition intervals of the identified pulse bursts; wherein the burst repetition intervals indicated by the plurality of burst entries are established based on results of the comparisons; wherein analyzing the burst history data includes determining a statistic based at least in part on indicated burst repetition intervals of the identified pulse bursts; and wherein determining whether the subset of pulses received by the device over the particular duration conform to the specification of the radar waveform with random characteristics includes determining whether the statistic complies with a criterion.*

20. A method comprising:

detecting signal pulses received by a device *over a particular duration;*

*filtering out received pulses whose arrival time relative to an earlier received pulse is less than a threshold time to produce a subset of received pulses that are not filtered out*;

identifying pulse bursts in [at least a] *the* subset of the received pulses;

storing burst history data pertaining to *the* identified pulse bursts, wherein the burst data includes an arrival time for each burst and a count of pulses for each burst;

removing burst history data that is older than a given age;

determining whether a set of conditions are true, wherein the set of conditions includes:

whether a *mean* burst repetition interval for bursts in the burst history data complies with a criterion, wherein a burst repetition interval is defined by the difference in arrival times of successive bursts;

whether a count of pulses in the burst history data complies with a criterion; and whether a count of bursts in the burst history data complies with a criterion; and if the set of conditions is true, outputting an indication that the *subset of* signal pulses received by a device include a bin-5 waveform.

21. The method of claim 20, wherein the condition of whether *the mean* burst repetition interval for bursts in the burst history data complies with a criterion is defined by:

whether [an average] *the mean* burst repetition interval for bursts in the burst history data is less than a maximum burst repetition interval, wherein a burst repetition interval is defined by the difference in arrival times of successive bursts.

22. The method of claim 21, wherein the condition of whether *the mean* burst repetition interval for bursts in the burst history data complies with a criterion is further defined by:

whether [the average] *the mean* burst repetition interval is more than a minimum burst repetition interval.

25. The method of claim 20, [further comprising] *wherein* filtering out received pulses whose arrival time relative to an earlier received pulse is less than a threshold time[, wherein the subset comprises only pulses that are not filtered out] *includes, for each pulse of the received pulses, computing a statistic of received pulse inter-arrival times for a number of recently received pulses that includes the each received pulse, and retaining or discarding the each received pulse based on whether the computed statistic of received pulse inter-arrival times satisfies a criterion.*

26. The method of claim 20, further comprising filtering out received pulses based on pulse width of the pulses received by the device[, wherein the subset comprises only pulses that are not filtered out].

27. A method comprising:

detecting signal pulses received over a particular duration;

filtering out received pulses whose arrival time relative to an earlier received pulse is less than a threshold time to produce a subset of received pulses that are not filtered out;

identifying pulse bursts in the subset of received pulses;

storing burst history data pertaining to the identified pulse bursts;

analyzing the burst history data; and based on the analysis of the burst history data, determining whether the subset of signal pulses received over the particular duration conform to a specification for a radar waveform with random characteristics;

wherein the radar waveform with random characteristics, according to the specification, comprises a plurality of pulse bursts over the particular duration, wherein a number of pulse bursts over the particular duration is random within a range, wherein burst repetition intervals of the plurality of pulse bursts are random over the particular duration, wherein burst repetition interval is defined by arrival times of successive pulse bursts, wherein a number of pulses per pulse burst is random within a ran, and wherein pulse repetition intervals of pulses in a pulse burst are random within a range, wherein pulse repetition interval in a pulse burst is defined by arrival times of successive pulses in the pulse burst;

wherein identifying the pulse bursts includes automatically forming, in a computer memory, a plurality of burst entries indicating burst repetition intervals of the identified pulse bursts, and includes automatically assigning the subset of pulses to the plurality of burst entries;

wherein analyzing the burst history data includes determining a statistic based at least in part on indicated burst repetition intervals of the identified pulse bursts; and wherein determining whether the subset of pulses received by the device over the particular duration conform to the specification of the radar waveform with random characteristics includes determining whether the statistic complies with a criterion;

wherein identifying pulse bursts includes performing, for each pulse in the subset of pulses that are not filtered out, a comparison between the arrival time of the each pulse and the arrival time of the immediately previously received pulse that is not filtered, and includes automatically forming the plurality of burst entries based on results of the comparisons; and wherein the burst repetition intervals indicated by the plurality of burst entries are established based on results of the comparisons;

wherein the method is performed by one or more computing devices.

28. The method of claim 27, wherein the radar waveform with random characteristics is a bin-5 radar waveform; and wherein analyzing the burst history data includes determining a mean burst repetition interval from indicated burst repetition intervals of the identified pulse bursts; and wherein determining whether the subset of pulses received by the device over the particular duration conform to the specification of the radar waveform with random characteristics includes determining whether the mean burst repetition interval complies with a criterion.

* * * * *